United States Patent Office 3,459,775
Patented Aug. 5, 1969

3,459,775
BICYCLO[2.2.1]HEPT-5(6)-YL COMPOUNDS
Edward A. Rick and Samuel W. Tinsley, Jr., Charleston, W. Va., assignors to Union Carbide Corporation, a corporation of New York
No Drawing. Filed Oct. 16, 1964, Ser. No. 404,474
Int. Cl. C07c *13/42;* C07d *1/00*
U.S. Cl. 260—348                                15 Claims

ABSTRACT OF THE DISCLOSURE 2-vinylbicyclo[2.2.1]hept-5(6)-yl and 2-epoxyethylbicyclo[2.2.1]hept-5(6)-yl compounds, wherein the vinyl compounds are prepared by the addition of active hydrogen-containing compounds to the strained-ring double bond of the bicycloheptene ring in 2-vinylbicyclo[2.2.1]hept-5-ene and the epoxy compounds are prepared by the epoxidation of the vinyl compounds. The compounds find utility as solvents for resins and oils, monomers for preparing synthetic waxes and resins, chemical intermediates for pharmaceuticals, wetting agents, insecticides, emulsifying agents, detergents, bactericides and fungicides.

---

This invention relates to a novel class of 2-vinyl- and 2-epoxyethylbicyclo[2.2.1]hept-5(6)-yl compounds, and to a method for their preparation. In one aspect, this invention relates to a novel sub-class of 2-vinylbicyclo[2.2.1]hept-5(6)-yl compounds, and to a method for their preparation. In another aspect, this invention relates to a novel sub-class of 2-epoxyethylbicyclo[2.2.1]hept-5(6)-yl compounds, and to a method for their preparation.

It has now been discovered that a heretofore unknown class of 2-vinyl- and 2-epoxyethylbicyclo[2.2.1]hept-5(6)-yl compounds can be prepared from 2-vinylbicyclo[2.2.1]hept-5-ene. In particular, it has been found that a variety of compounds containing active hydrogen atoms as defined hereinafter can be readily added to the strained-ring double bond of the bicycloheptene ring in 2-vinylbicyclo[2.2.1]hept-5-ene to produce a novel sub-class of 2-vinylbicyclo[2.2.1]hept-5(6)-yl compounds. Moreover, it also has been found that these 2-vinylbicyclo[2.2.1]hept-5(6)-yl compounds can be epoxidized to produce a still further novel sub-class of 2-epoxybicyclo[2.2.1]hept-5(6)-yl compounds.

Accordingly, it is an object of this invention to provide a novel class of 2-vinyl- and 2-epoxyethylbicyclo[2.2.1]hept-5(6)-yl compounds. It is a specific object to provide a novel sub-class of 2-vinylbicyclo[2.2.1]hept-5(6)-yl compounds. It is a further specific object to provide a novel sub-class of 2-epoxyethylbicyclo[2.2.1]hept-5(6)-yl compounds. It is yet another object to provide a novel sub-class of 2-epoxyethylbicyclo[2.2.1]hept-5(6)-yl vicinal epoxides. It is yet a further object to provide novel 2-vinylbicyclo[2.2.1]hept-5(6)-yl esters, 2-vinylbicyclo[2.2.1]hept-5(6)-yl ethers, 2-epoxyethylbicyclo[2.2.1]hept-5(6)-yl esters, 2-epoxyethylbicyclo[2.2.1]hept-5(6)-yl ethers, and the like. It is still another object to provide novel bis(2-vinyl- and 2-epoxyethylbicyclo[2.2.1]hept-5(6)-yl compounds, tris(2-vinyl- and 2-epoxyethylbicyclo[2.2.1]hept-5(6)-yl compounds and tetra(2-vinyl- and 2-epoxyethylbicyclo[2.2.1]hept-5(6)-yl compounds. It is yet another object to provide a novel method for the preparation of the 2-vinyl- and 2-epoxyethylbicyclo[2.2.1]hept-5(6)-yl compounds as disclosed herein. These and other objects of this invention will become apparent to those skilled in the art to which this invention pertains from the ensuing description thereof.

In a broad aspect, the novel class of 2-vinyl- and 2-epoxyethylbicyclo[2.2.1]hept-5(6)-yl compounds of this invention can be represented by Formula I:

(I) 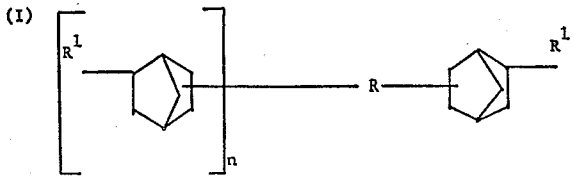

wherein $n$ has a value of from 0 to 3, inclusive; R is the residue remaining after the loss of only active hydrogen from an active hydrogen-containing compound, or the vicinal epoxy derivative of said residue when $n$ is 0; and each $R^1$ is either the vinyl group (—CH=CH$_2$) or the epoxyethyl group

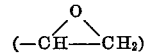

The preferred form of the 2-vinyl- and 2-epoxyethylbicyclo[2.2.1]hept-5(6)-yl compounds represented by Formula I, are those wherein $n$ is 0 or 1, and R and each $R^1$ are as hereinabove defined with reference to Formula I.

As used herein, the term "residue" is meant that portion of a compound, containing from one to four active hydrogen atom(s), which remains after only the loss of said active hydrogen atom(s) from said compound, said portion of which adds to the double bond in the bicycloheptene ring of 2-vinylbicyclo[2.2.1]hept-5-ene. The residue may be mono-, di-, tri-, or tetravalent, depending upon the number of hydrogen atoms lost by the active hydrogen-containing compound. The term "active hydrogen-containing compound" as used herein refers to compounds having a replaceable hydrogen atom attached to either oxygen, sulfur, or halogen atoms, as disclosed herein. It does not refer to hydrogen atoms attached to nitrogen or other atoms, except as disclosed herein. The term "active hydrogen-containing compound" as defined herein includes acids, alcohols, glycols, water, hydrogen halides, isothiocyanic acid, and geminal dihydroxy compounds wherein a hydrogen atom is attached to either oxygen, sulfur or halogen atoms, as disclosed herein. It does not include, for example, acetylene, amines, amides, or sulfinic acids. By the term "vicinal epoxy" is meant a cyclic three membered ether

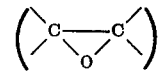

In general, with reference to Formula I, when $n$ is 0 to 3, inclusive, illustrative R residues include among others, the residues of for example, saturated or olefinically unsaturated aliphatic or alicyclic acids; aromatic acids; saturated or olefinically unsaturated dibasic acids; saturated or olefinically unsaturated half-acid esters of dibasic acids; saturated or olefinically unsaturated tribasic acids; saturated or olefinically unsaturated partial-acid esters of tribasic acids, saturated or olefinically unsaturated, tetrabasic acids; saturated or olefinically unsaturated partial-acid esters of tetrabasic acids; isothiocyanic acid; hydrogen halides; alcohols such as, saturated or olefinically unsaturated aliphatic or alicyclic monoalcohols; saturated or olefinically unsaturated aliphatic diols, triols and tetraols; phenols; saturated or olefinically unsaturated aliphatic or alicyclic mercaptans; thiophenols; water; and the like. In addition, the foregoing residues can be substituted with simple substituents such as, for example, halo, hydroxy, cyano, thio, nitro, and like groups.

In particular, with reference to Formula I, when $n$ is 0 to 3, inclusive, illustrative R residues include among others, the residues of, for example, saturated aliphatic monocarboxylic acids of from 1 to 20 carbon atoms, such as, for example, formic, acetic, propionic, butyric, isobutyric, valeric, isovaleric, hexanoic, heptanoic, octanoic, nonanoic, decanoic, undecanoic, dodecanoic, tetradecanoic, hexadecanoic, heptadecanoic, octadecanoic, and the like; olefinically unsaturated aliphatic monocarboxylic acids of from 3 to 20 carbon atoms, such as, for example, acrylic, 3-butenoic, methacrylic, crotonic, 2,4-hexadienoic, oleic, elaidic, linoleic, linolenic, and the like, saturated aliphatic di-, tri-, and tetracarboxylic acids of from 2 to 12 carbon atoms such as, for example, oxalic, malonic, succinic, glutaric, adipic, pimelic, suberic, azelaic, sebacic, 1,2,3-propanetricarboxylic, 1,2,3,4-butanetetracarboxylic, and the like, olefinically unsaturated aliphatic di-, tri-, and tetracarboxylic acids of from 4 to 10 carbon atoms such as, for example, maleic, fumaric, itaconic, and the like; alicyclic acids of from 4 to 20 carbon atoms such as, for example, cyclopropanecarboxylic, cyclopentanecarboxylic, hydrocarpic, chaulmoogric, hexadrobenzoic, 2,3,4,5-tetrahydrobenzoic, abietic, camphoric, hexahydrophthalic, and the like; aromatic monocarboxylic acids of from 7 to 15 carbon atoms such as, for example, benzoic, 1-naphthoic, o-toluic, phenylacetic, and the like; aromatic di- and polycarboxylic acids of from 8 to 16 carbon atoms such as, for example, phthalic, isophthalic, terephthalic, o-phenylenediacetic, 1,2,3,4-, 1,2,3,5- and 1,2,4,5-benzenetetracarboxylic, and the like; substituted aliphatic acids of from 2 to 12 carbon atoms such as, for example, glycolic, lactic, gluconic, malic, tartaric, citric, chloroacetic, α-bromobutyric, thioglycolic, cyanoacetic, and the like; substituted aromatic acids of from 7 to 14 carbon atoms such as for example, o-chlorobenzoic, o-nitrobenzoic, 3,5-dinitrobenzoic, salicylic, m-hydroxybenzoic, gallic, mandelic, and the like; saturated aliphatic monohydroxy alcohols of from 1 to 18 carbon atoms such as, for example, methanol, ethanol, 1-propanol, 2-propanol, 1-butanol, 2-methyl-1-propanol, 2-butanol, 2-methyl-2-propanol, 1-pentanol, 3-methyl-1-butanol, 2-methyl-2-butanol, 2-pentanol, 3-pentanol, 1-hexanol, 1-heptanol, 1-octanol, 2-octanol, 1-nonanol, 1-dodecanol, 1-octadecanol, and the like; olefinically unsaturated aliphatic monohydroxy alcohols of from 3 to 20 carbon atoms such as, for example, allyl alcohol, propargyl alcohol, crotyl alcohol, oleyl alcohol, citronellol, geraniol, linoleyl alcohol, and the like; oxyalkylene glycol monoethers,

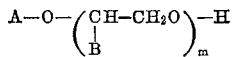

wherein A is alkyl of from 1 to 18 carbon atoms, B is hydrogen, methyl or ethyl and $m$ has a value of from 1 to 4; saturated aliphatic dihydroxy alcohols of 2 to 18 carbon atoms such as, for example, ethylene glycol, propylene glycol, trimethylene glycol, 2,3-butylene glycol, tetramethylene glycol, sym-dimethylethylene glycol, hexamethylene glycol; polyoxyalkylene glycols such as diethylene glycol, triethylene glycol, tetra-, penta-, etc. ethylene glycols, di-, tri-, tetra-, etc. propylene glycols and butylene glycols and the like; saturated aliphatic polyhydroxy alcohols of from 3 to 10 carbon atoms such as, for example, glycerol, trimethylolpropane, pentaerythritol, mannitol, sorbitol, and the like; alicyclic alcohols of from 5 to 28 carbon atoms such as, for example, cyclopentanol, cyclohexanol, 2-methyl cyclohexanol, menthol, borneol, cholesterol, ergosterol, inositol, and the like; araliphatic alcohols of from 7 to 16 carbon atoms such as, for example, benzyl alcohol, 2-phenylethyl alcohol, benzhydrol, triphenylcarbinol, cinnamyl alcohol, salicyl alcohol, coniferyl alcohol, and the like; phenols such as phenol, 2,6-di-tert-butyl-4-methylphenol, 2,6-di-tert-butylphenol, 2,2-bis(p-hydroxyphenyl)propane, and the like.

In particular, with reference to Formula I, illustrative vicinal epoxy derivatives of R include, among others, the vicinal epoxides of olefinically unsaturated aliphatic or alicyclic acids; olefinically unsaturated dibasic acids; olefinically unsaturated half-acid esters of dibasic acids; olefinically unsaturated tri- and tetrabasic acids; olefinically unsaturated partial-acid esters of tri- and tetrabasic acids; olefinically unsaturated aliphatic or alicyclic alcohols, olefinically unsaturated aliphatic polyols, and the like. In addition, the foregoing vicinal epoxy derivatives of R can be substituted with simple substituents such as, for example, halo, hydroxy, cyano, nitro, and like groups.

In particular, with reference to Formula I, ilustrative vicinal epoxy derivatives of R include, among others, the epoxides of olefinically unsaturated aliphatic monocarboxylic acids of from 3 to 19 carbon atoms such as, for example, acrylic acid, 3-butenoic acid, methacrylic acid, crotonic acid, oleic acid, linolenic acid, and the like; olefinically unsaturated aliphatic monohydroxy alcohols of from 3 to 18 carbon atoms such as, for example, allyl alcohol, propargyl alcohol, crotyl alcohol, oleyl alcohol, citronellol, geraniol, linolenyl alcohol, and the like.

Illustrative specific 2-vinyl- and 2-epoxyethyl bicyclo [2.2.1]hept-5(6)-yl compounds within the novel class encompassed by Formula I, include, among others, 2-vinylbicyclo[2.2.1]hept-5(6)-yl acetate, 2-epoxyethylbicyclo [2.2.1]hept-5(6)-yl acetate, 2-vinylbicyclo[2.2.1]hept-5 (6)-yl propionate, 2-epoxyethylbicyclo[2.2.1]hept-5(6)-yl propionate, 2-vinylbicyclo-[2.2.1]hept-5(6)-yl butyrate, 2-epoxyethylbicyclo[2.2.1]hept-5(6)-yl butyrate, 2-vinylbicyclo[2.2.1]hept-5(6)-yl valerate, 2-epoxyethylbicyclo [2.2.1]hept-5(6)-yl valerate, 2-vinylbicyclo-[2.2.1]hept-5 (6)-yl hexanoate, 2-epoxyethylbicyclo[2.2.1]hept-5(6)-yl hexanoate, 2-vinylbicyclo[2.2.1]hept-5(6)-yl heptanoate, 2-epoxyethylbicyclo[2.2.1]hept-5(6)-yl heptanoate, 2-vinylbicyclo [2.2.1]hept-5(6)-yl octanoate, 2-epoxyethylbicyclo[2.2.1]hept-5(6)-yl octanoate, 2-vinylbicyclo[2.2.1] hept-5(6)-yl nonanoate, 2-epoxyethylbicyclo[2.2.1]hept-5(6)-yl nonanoate, 2-vinylbicyclo-[2.2.1]hept-5(6)-yl decanoate, 2 - epoxyethylbicyclo[2.2.1]hept-5(6)-yl decanoate, 2-vinylbicyclo[2.2.1]hept-5(6)-yl hexadecanoate, 2-epoxyethylbicyclo[2.2.1]hept-5(6)-yl hexadecanoate, 2-vinylbicyclo[2.2.1]hept-5(6)-yl heptadecanoate, 2-epoxyethylbicyclo[2.2.1]hept-5(6)-yl heptadecanoate, 2-vinylbicyclo[2.2.1]-hept-5(6)-yl octadecanoate, 2-epoxyethylbicyclo[2.2.1]hept-5(6)-yl octadecanoate, and the like; 2-vinylbicyclo[2.2.1]hept-5(6)-yl crotonate, 2-epoxyethylbicyclo[2.2.1]hept-5(6)-yl crotonate, 2-vinylbicyclo[2.2. 1]hept-5(6)-yl oleate, and the like; 2-vinylbicyclo[2.2.1] hept-5(6)-yl cyclopropanecarboxylate, 2 - epoxyethylbicyclo[2.2.1]hept-5(6)-yl cyclopropanecarboxylate, 2-vinylbicyclo[2.2.1]hept-5(6)-yl cyclopentanecarboxylate, 2-epoxyethylbicyclo[2.2.1]hept-5(6)-yl cyclopentanecarboxylate, and the like; 2 - vinylbicyclo[2.2.1]hept - 5(6) - yl benzoate, 2-epoxyethylbicyclo[2.2.1]hept-5(6)-yl benzoate, 2-vinylbicyclo-[2.2.1]hept-5(6)-yl 1-naphthoate, 2-epoxyethylbicyclo[2.2.1]hept-5(6)-yl 1-naphthoate, and the like; 2-epoxyethylbicyclo[2.2.1]hept-5(6)-yl 1,2-epoxyacrylate, 2-epoxyethylbicyclo[2.2.1]hept-5(6)-yl 1,2-epoxymethacrylate, and the like; 2-vinylbicyclo[2.2.1]hept-5 (6)-yl methyl ether, 2-epoxyethylbicyclo[2.2.1]hept-5(6)-yl methyl ether, 2-vinylbicyclo[2.2.1]hept-5(6)-yl ethyl ether, 2-epoxyethylbicyclo[2.2.1]hept-5(6)-yl ethyl ether, 2-vinylbicyclo[2.2.1]hept-5(6)-yl propyl ether, 2-epoxyethylbicyclo[2.2.1]hept-5(6)-yl propyl ether, 2-vinylbicyclo[2.2.1]hept-5(6)-yl 1-butyl ether, 2-epoxyethylbicyclo-[2.2.1]hept-5(6)-yl 1-butyl ether, 2-vinylbicyclo[2.2.1]-hept-5(6)-yl 1-pentyl ether, 2-epoxyethylbicyclo[2.2.1]-hept-5(6)-yl 1-pentyl ether, and the like; 2-vinylbicyclo-[2.2.1]hept-5(6)-yl vinyl ether, 2-vinylbicyclo[2.2.1]-hept-5(6)-yl allyl ether, 2-epoxyethylbicyclo[2.2.1]hept-5(6)-yl allyl ether, and the like; 2-epoxyethylbicyclo-[2.2.1]hept-5(6)-yl 2,3-epoxybutyl ether, 2-epoxyethylbicyclo[2.2.1]hept-5(6)-yl glycidyl ether, and the 2-vinylbicyclo[2.2.1]hept-5(6)-yl benzyl ether, 2-epoxyethylbicyclo[2.2.1]hept-5(6)-yl benzyl ether, and the like; bis-(2-vinylbicyclo[2.2.1]hept-5(6)-yl) oxalate, bis(2-epoxyethylbicyclo[2.2.1]hept-5(6)-yl oxalate, bis(2 - vinylbicyclo[2.2.1]hept-5(6)-yl) malonate, bis(2-epoxyethylbicyclo-[2.2.1]hept-5(6)-yl) malonate, bis(2-vinylbicyclo[2.2.1]-hept - 5(6) - yl) succinate, bis(2-epoxyethylbicyclo[2.2.1]

hept-5(6)-yl) succinate, bis(2-vinylbicyclo[2.2.1]hept-5(6)-yl) glutarate, bis(2 - epoxyethylbicyclo[2.2.1]hept - 5(6)-yl)glutarate, bis(2-vinylbicyclo-[2.2.1]hept-5(6)-yl) adipate, bis(2-epoxyethylbicyclo[2.2.1]hept - 5(6) - yl) adipate, tris(2-vinylbicyclo[2.2.1]hept-5(6)-yl) tricarballylate, tris(2 - epoxyethylbicyclo[2.2.1]hept-5(6)-yl) tricarballylate, and the like; bis (2-vinylbicyclo[2.2.1]hept-5(6)-yl) maleate, bis(2-epoxyethylbicyclo[2.2.1]hept-5(6)-yl) maleate, bis(2-vinylbicyclo[2.2.1]hept-5(6)-yl) fumarate, bis(2-epoxyethylbicyclo[2.2.1]hept - 5(6) - yl) fumarate, tris(2-vinylbicyclo[2.2.1]hept-5(6)-yl) aconitate, tris(2-epoxyethylbicyclo[2.2.1]hept-5(6)-yl) aconitate, and the like; propylene glycol bis(2-vinylbicyclo[2.2.1]hept-5(6)-yl) ether, propylene glycol bis(2-epoxyethylbicyclo[2.2.1]-hept-5(6)-yl) ether, trimethylene glycol bis(2-vinylbicyclo[2.2.1]hept-5(6)-yl) ether, trimethylene glycol bis(2-epoxyethylbicyclo[2.2.1]hept-5(6)-yl) ether, glycerol tris-(2-vinylbicyclo[2.2.1]hept-5(6)-yl ether, glycerol tris(2-epoxyethylbicyclo[2.2.1]hept-5(6)-yl) ether, and the like, diethylene glycol bis(2-vinylbicyclo[2.2.1]hept-5(6)-yl) ether, triethylene glycol bis(2 - vinylbicyclo[2.2.1]hept-5(6)-yl), and the like.

A novel sub-class of 2-vinylbicyclo[2.2.1]hept-5(6)-yl compounds encompassed within this invention are the 2-vinylbicyclo[2.2.1]hept-5(6)-yl compounds which can be represented by Formula II:

(II)

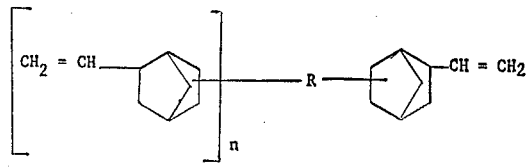

wherein $n$ is a value of from 0 to 3, inclusive, and R is the residue remaining after the loss of only active hydrogen from an active hydrogen-containing compound as defined hereinabove. Of the above sub-class, those preferred 2-vinylbicyclo[2.2.1]hept-5(6)-yl compounds are those wherein $n$ is 0 or 1.

Particularly preferred 2-vinylbicyclo[2.2.1]hept-5(6)-yl compounds represented by Formulae I and II when $n$ is 1, (III)

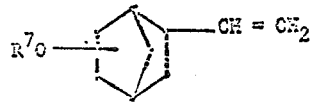

wherein $R^2$ is either a —S—, —O—, —O—$R^3$—O—, —OOC—$R^4$—COO—,

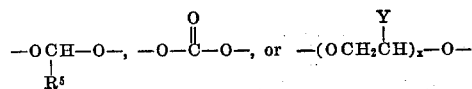

$R^3$ is ether alkylene of from 1 to 18 carbon atoms, alkenylene of from 4 to 20 carbon atoms, cycloalkylene of from 5 to 12 carbon atoms, cycloalkenylene of from 5 to 12 carbon atoms, or arylene of from 6 to 10 carbon atoms; and $R^4$ is either alkylene of from 1 to 18 carbon atoms, alkenylene of from 2 to 20 carbon atoms; cycloalkylene of from 5 to 12 carbon atoms, cycloalkenylene of from 5 to 12 carbon atoms, or arylene of from 6 to 10 carbon atoms; $R^5$ is either hydrogen, alkyl of from 1 to 18 carbon atoms, alkenyl of from 2 to 20 carbon atoms, cycloalkyl of from 5 to 12 carbon atoms, cycloalkenyl of from 5 to 12 carbon atoms, and aryl of from 6 to 10 carbon atoms; Y is either hydrogen, methyl or ethyl; and $x$ is an integer of from 1 to 5, inclusive.

Highly preferred 2 - vinylbicyclo[2.2.1]hept-5(6)-yl compounds represented by Formula III, are those represented by Formula IV:

(IV)

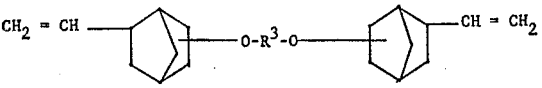

wherein $R^3$ is alkylene of from 1 to 20 carbon atoms, preferably alkylene of from 2 to 4 carbon atoms. Illustrative alkylene groups of from 1 to 20 carbon atoms include, for example, methylene, ethylene, trimethylene, tetramethylene, pentamethylene, hexamethylene, heptamethylene, octamethylene, nonamethylene, decamethylene, octadecamethylene, alkyleneoxyalkylenes such as ethyleneoxyethylene, propyleneoxybutylene and the like.

Particularly preferred 2-vinylbicyclo[2.2.1]hept-5(6)-yl compounds represented by Formula II when $n$ is 0, are those represented by Formula V:

(V)

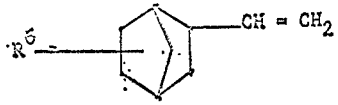

wherein $R^6$ is either HO—, HS—, HCOO—, —NCS, $R^7S$—, $R^7O$—, $R^7COO$—, or $R^7OOC$—$R^8$—COO—; $R^7$ is either alkyl of from 1 to 18 carbon atoms, alkenyl of from 2 to 20 carbon atoms, cycloalkyl of from 5 to 12 carbon atoms, cycolalkenyl of from 5 to 12 carbon atoms, or aryl of from 6 to 10 carbon atoms; and $R^8$ is either alkylene of from 1 to 18 carbon atoms, alkenylene of from 2 to 20 carbon atoms, cycloalkylene of from 5 to 12 carbon atoms, cycloalkenylene of from 5 to 12 carbon atoms, or arylene of from 6 to 10 carbon atoms.

Highly preferred 2 - vinylbicyclo[2.2.1]hept-5(6)-yl compounds represented by Formula V are those represented by Formulae VI and VII:

(VI)  (VII)

wherein each $R^7$ is alkenyl of from 2 to 20 carbon atoms, preferably alkenyl of from 2 to 4 carbon atoms. Illustrative alkenyl groups of from 2 to 20 carbon atoms include, for example, vinyl, allyl, isopropenyl, 3-butenyl, 4-pentenyl, 5-hexenyl, 6-heptenyl, 7-octenyl, 3-nonenyl, 9-decenyl, 17-octadecenyl, and the like.

Illustrative 2 - vinylbicyclo[2.2.1]hept - 5(6)-yl compounds encompassed within the sub-class represented for Formula II include, among others, the 2-vinylbicyclo-[2.2.1]hept-5(6)-yl esters such as, 2-vinylbicyclo[2.2.1]hept-5(6)-yl acetate,
2-vinylbicyclo[2.2.1]hept-5(6)-yl propionate,
2-vinylbicyclo[2.2.1]hept-5(6)-yl butyrate,
2-vinylbicyclo[2.2.1]hept-5(6)-yl valerate,
2-vinylbicyclo[2.2.1]hept-5(6)-yl hexanoate,
2-vinylbicyclo[2.2.1]hept-5(6)-yl heptanoate,
bis(2-vinylbicyclo[2.2.1]hept-5(6)-yl) oxalate,
bis(2-vinylbicyclo[2.2.1]hept-5(6)-yl) malonate,
bis(2-vinylbicyclo[2.2.1]hept-5(6)-yl) succinate,
tris(2-vinylbicyclo[2.2.1]hept-5(6)-yl) aconitate,
2-vinylbicyclo[2.2.1]hept-5(6)-yl formate,
2-vinylbicyclo[2.2.1]hept-5(6)-yl bromide,
2-vinylbicyclo[2.2.1]hept-5(6)-yl thiocyanate,
2-vinylbicyclo[2.2.1]hept-5(6)-yl acrylate, 2-vinylbicyclo[2.2.1]hept-5(6)-yl methacrylate, and the like;
the 2-vinylbicyclo[2.2.1]hept-5(6)-yl ethers such as,
2-vinylbicyclo[2.2.1]hept-5(6)-yl methyl ether,
2-vinylbicyclo[2.2.1]hept-5(6)-yl ethyl ether,
2-vinylbicyclo[2.2.1]hept-5(6)-yl propyl ether,
2-vinylbicyclo[2.2.1]hept-5(6)-yl butyl ether,
propylene glycol bis(2-vinylbicyclo[2.2.1]hept-5(6)-yl) ether,
trimethylene glycol bis(2-vinylbicyclo[2.2.1]hept-5(6)-yl) ether,
glycerol tris(2-vinylbicyclo[2.2.1]hept-5(6)-yl) ether,
ethylene glycol bis(2-vinylbicyclo[2.2.1]hept-5(6)-yl) ether,
bis(2-vinylbicyclo[2.2.1]hept-5(6)-yl) ether, and the like; and alcohols such as 2-vinylbicyclo[2.2.1]heptan-5(6)-ol, ethylene glycol mono(bicyclo[2.2.1]hept-5(6)-yl) ether, and the like.

Another novel sub-class of 2-vinyl- and 2-epoxyethyl-bicyclo[2.2.1]hept-5(6)-yl compounds of this invention are the 2-epoxyethylbicyclo[2.2.1]hept-5(6)-yl compounds which can be represented by Formula VIII:

(VIII)

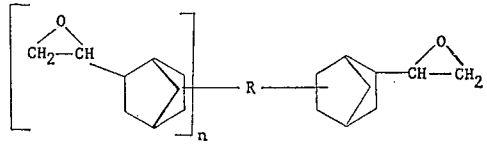

wherein R is the residue remaining after the loss of only active hydrogen from an active hydrogen-containing compound and $n$ is a value of 0, 1, 2, or 3, inclusive.

Particularly preferred 2-epoxyethylbicyclo[2.2.1]-hept-5(6)-yl compounds encompassed by Formula VIII, are those represented by Formula IX:

(IX)

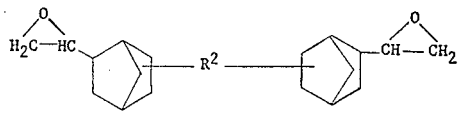

where $R^2$ is either —SO$_2$—, —O—, —O—$R^3$—O—, —OOC—$R^4$—COO—,

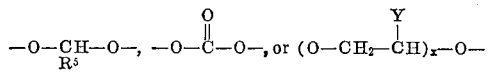

$R^3$ is either alkylene of from 1 to 18 carbon atoms, cycloalkylene of from 5 to 12 carbon atoms, or arylene of from 6 to 10 carbon atoms, $R^4$ is either alkylene of from 1 to 18 carbon atoms, alkenylene of 2 carbon atoms, cycloalkylene of from 5 to 12 carbon atoms, and arylene of from 6 to 10 carbon atoms; $R^5$ is either hydrogen, alkyl of from 1 to 18 carbon atoms, cycloalkyl of from 5 to 12 carbon atoms, and aryl of from 6 to 10 carbon atoms; Y is either hydrogen, methyl or ethyl; and $x$ is an integer of from 1 to 5, inclusive.

Highly preferred 2-epoxyethylbicyclo[2.2.1]hept-5(6)-yl compounds represented by Formula IX are those represented by Formula X:

(X)

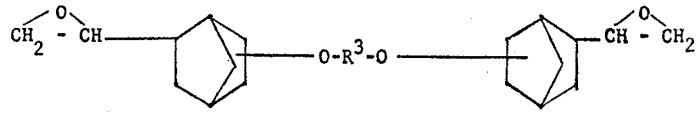

wherein $R^3$ is alkylene of from 1 to 20 carbon atoms, preferably 2 to 4 carbon atoms.

Particularly preferred 2-epoxyethylbicyclo[2.2.1]hept-5(6)-yl compounds represented by Formula VIII are those represented by Formula XI:

(XI)

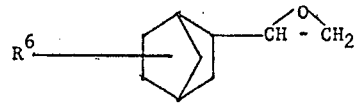

wherein $R^6$ is either HO—, HCOO—, $R^7SO_2$—, $R^7O$—, $R^9COO$—, or $R^{10}OOC$—$R^8$—COO—; $R^7$ is ether alkyl of from 1 to 18 carbon atoms, epoxyalkyl of from 3 to 20 carbon atoms wherein the epoxide moiety

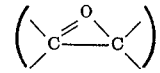

is at least one carbon atom removed from the —SO$_2$— or ether —O— atoms, cycyoalkyl of from 5 to 12 carbon atoms, epoxycloalkyl of from 5 to 12 carbon atoms wherein the epoxide moiety is at least one carbon atom removed from the —SO$_2$— or ether —O— atoms, or aryl of from 6 to 10 carbon atoms; $R^8$ is either alkylene of from 1 to 18 carbon atoms or $$-\underset{R^{11}}{C}=\underset{R^{11}}{C}-$$

epoxyalkylene of from 4 to 20 carbon atoms wherein the epoxide moiety is at least one carbon atom removed from both —OOC— moieties, epoxycycloalkylene of from 5 to 12 carbon atoms wherein the epoxy moiety is at least one carbon atom removed from both of the —OOC— moiety, and arylene of from 6 to 10 carbon atoms; $R^9$ is either alkyl of from 1 to 18 carbon atoms, vinyl,

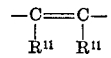

epoxyalkyl of from 3 to 20 carbon atoms wherein the epoxy moiety is at least one carbon atom removed from the —COO— moiety, cycloalkyl of from 5 to 12 carbon atoms, epoxycycloalkyl of from 5 to 12 carbon atoms wherein the epoxy moiety is at least one carbon atom removed from the —COO—moiety, and aryl of from 6 to 10 carbon toms; $R^{10}$ is either alkyl of from 1 to 18 carbon atoms, cycloalkyl of from 5 to 12 carbon atoms, epoxyalkyl of from 3 to 20 carbon atoms wherein the epoxy moiety is at least one carbon atom removed from the —OOC—moiety, epoxycycloalkyl of from 5 to 12 carbon atoms wherein the epoxy moiety is at least one carbon atom removed from the —OOC— moiety, and aryl of from 6 to 10 carbon atoms; and $R^{11}$ is either hydrogen or alkyl of from 1 to 18 carbon atoms.

Highly preferred 2 - epoxyethyl bicyclo[2.2.1]hept-5(6)-yl compounds represented by Formula VIII, are those represented by Formulae XII and XIII:

(XII) 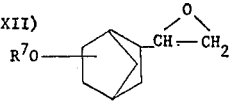   (XIII) 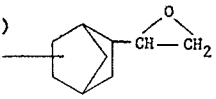

wherein each $R^7$ is epoxyalkyl of from 3 to 20 carbon atoms wherein the epoxy moiety is at least one carbon atom removed from the ether —O— moiety or —COO— moiety, as the case may be.

Illustrative 2 - epoxyethylbicyclo[2.2.1]hept - 5(6) - yl compounds represented by Formula VIII, include, among others, the 2-epoxyethylbicyclo[2.2.1]hept-5(6)-yl esters such as, 2-epoxyethylbicyclo[2.2.1]hept-5(6)-yl acetate,
2-epoxyethylbicyclo[2.2.1]hept-5(6)-yl propionate,
2-epoxyethylbicyclo[2.2.1]hept-5(6)-yl butyrate,
2-epoxyethylbicyclo[2.2.1]hept-5(6)-yl valerate,
2-epoxyethylbicyclo[2.2.1]hept-5(6)-yl hexanoate,
2-epoxyethylbicyclo[2.2.1]hept-5(6)-yl heptanoate,
bis(2-epoxyethylbicyclo[2.2.1]hept-5(6)-yl) maleate, and the like;
the 2-epoxyethylbicyclo[2.2.1]hept-5(6)-yl ethers such as,
2-epoxyethylbicyclo[2.2.1]hept-5(6)-yl ethyl ether,
2-epoxyethylbicyclo[2.2.1]hept-5(6)-yl propyl ether,
2-epoxyethylbicyclo[2.2.1]hept-5(6)-yl glycidyl ether,
propylene glycol bis(2-epoxyethylbicyclo[2.2.1]hept-5(6)-yl) ether,
trimethylene glycol bis(2-epoxyethylbicyclo[2.2.1]hept-5(6)-yl) ether,
glycerol tris(2-epoxyethylbicyclo[2.2.1]hept-5(6)-yl) ether, and the like.

In general, the compounds of this invention can be prepared in two steps. In the first step, the 2-vinylbicyclo-[2.2.1]hept-5(6)-yl compounds are prepared by the addition of a compound containing an active hydrogen atom as defined hereinabove to the 2-vinylbicyclo[2.2.1]hept-5-ene. The 2-vinylbicyclo[2.2.1]hept-5-ene starting material can be prepared in good yields by the condensation of cyclopentadiene with butadiene according to the method disclosed in Chemical Abstracts, 53, 4232d (1959).

In many instances it is preferably to carry out the addition reaction in the presence of an acid catalyst. Some acid catalyst is necessary except where the active hydrogen compound is itself acidic (i.e., formic acid, trichloroacetic acid) and the like. The acid catalysts which can be employed include, among others, sulfuric acid, boron trifluoride, organic sulfonic acids, for example benzene sulfonic acid, or methyl sulfonic acid; coordination complexes of boron trifluoride with oxygenated compounds such as ethers, as $BF_3O—(C_2H_5)_2$; carboxylic acids, as $BF_3 \cdot 2CH_3COOH$; alcohols, as $(BF_3)2C_4H_9OH$; ketones such as $BF_3 \cdot CH_3COCH_3$; and water, such as $$BF_3 \cdot H_2O \quad BF_3 \cdot 2H_2O$$

acidic ion exchange resins (insoluble acidic materials) i.e., "Amberlites" and "Zeolites"; silicates; and "Dowex" resins; furthermore, the halides of amphoteric metals such as zinc chloride, stannic chloride, titanium tetrachloride, antimony chloride, aluminum chloride, or ferric chloride may be used as catalysts in the process of this invention. The amount of catalyst which can be employed ranges from about 0.0001 to about 25% by weight of 2-vinylbicyclo[2.2.1]hept-5-ene with a range of from about 2 to about 10% being preferred.

The temperature at which the first step can be carried out successfully ranges from room temperature or below to about 250° C., with a range of from about 80° C. to about 150° C. being preferred. An excess of the active hydrogen-containing compound is generally employed but is not essential. The amount of active hydrogen-containing compounds employed often depends upon the particular addition product desired, so it can vary within wide limits. The pressure employed in the first step of the process of this invention can be atmospheric, subatmospheric or superatmospheric, with atmospheric being preferred.

In carrying out the first step of the process of this invention, it is preferred that the 2-vinylbicyclo[2.2.1]hept-5-ene be added slowly to an excess of the active hydrogen-containing compound in the presence of an acid catalyst. In this way, residue formation is minimized. In addition, it is sometimes preferable to carry out the addition reaction in the presence of a free radical inhibitor in order to minimize polymerization of, for example, the ester addition products such as, the acrylates and methacrylates which readily polymerize. Distillation of the acrylates, methacrylates and other sensitive products is preferably carried out under very high vacuum and in such a manner that both the liquid and the vapors are in contact with a free radical inhibitor at all times. This is best accomplished by passing a very slow stream of nitric oxide through the system. Suitable free radical inhibitors include, among others, nitric oxide, hydroquinone, hydroquinone monomethyl ether, and the like.

It is to be noted that this invention intends to encompass the derivatives of the hydrate of 2-vinylbicyclo[2.2.1]hept-5-ene, that is, 2-vinylbicyclo[2.2.1]heptan-5(6)-ol (Example IX) such as, the bis-ether, the carbonate, and the acetals.

In the second step of the process of this invention, the 2-epoxyethylbicyclo[2.2.1]hept-5(6)-yl compounds generally are prepared by the epoxidation of said 2-vinylbicyclo[2.2.1]hept-5(6)-yl compounds. In this step, the vinyl group on the number 2-ring position (2-vinyl) is epoxidized, or the olefinic double bond(s) in the residue on the -5(6) ring positions of the 2-vinylbicyclo[2.2.1]hept-5(6)-yl compound, is epoxidized or both.

The epoxidizing agents suitable in the second step are active oxygen agents such as, for example, hydrogen peroxide, the organic peracids, metal-activated hydrogen peroxide, alkaline hydrogen peroxide, and the like. The amount of epoxidizing agent can range from less than stoichiometric amounts to greater than stoichiometric amounts, with a 5 to 10% excess generally being preferred. Of course, the amount of epoxidizing agent depends upon the final product desired, i.e., monoepoxide, diepoxide, and so forth, so it, of course, can vary with the amount of epoxidation desired. The preferred epoxidizing agent is peracetic acid.

The temperature of the epoxidation reaction can range from about 0° C. to about 100° C., with a temperature range of from about 30° C. to about 80° C. being preferred. The pressure employed in the epoxidation can range from subatmospheric to superatmospheric with atmospheric being preferred.

The following examples will more fully illustrate the process and the 2-vinyl and 2-epoxyethylbicyclo[2.2.1]hept-5(6)-yl compounds of this invention.

Example I.—2-vinylbicyclo[2.2.1]hept-5(6)-yl formate

A mixture of 120 grams of 2-vinylbicyclo[2.2.1]hept-5-ene and 180 grams of 98 percent formic acid was refluxed for 4 hours and then distilled to give 98 grams of 2-vinylbicyclo[2.2.1]hept-5(6)-yl formate, B.P. 90°/10 mm., $n$ 30/D 1.4756.

*Analysis.*—Calculated for $C_{10}H_{14}O_2$: C, 72.26; H, 8.49. Found: C, 72.48; H, 8.62.

Example II.—2-epoxyethylbicyclo[2.2.1]hept-5(6)-yl formate

To 100 grams of 2-vinylbicyclo[2.2.1]hept-5(6)-yl formate, prepared as in Example I, which was maintained with stirring at 40° C., there was added dropwise over a two hour period 223 grams of a 25.6 percent solution of peracetic acid in ethyl acetate. After an additional two hours at 60° C. the reaction was complete as indicated by a titration for unreacted peracetic acid. The solution was freed of volatiles by co-distillation with 400 grams of ethylbenzene and the residue was distilled through a short column to give 98 grams of 2-epoxyethylbicyclo [2.2.1]hept-5(6)-yl formate. A hearts cut had the following properties: B.P. 87°/0.35 mm., $n$ 30/D 1.4827.

*Analysis.*—Calculated for $C_{10}H_{14}O_3$: C, 65.93; H, 7.69. Found: C, 66.12; H, 7.63.

Example III.—2-vinylbicyclo[2.2.1]hept-5(6)-yl chloride

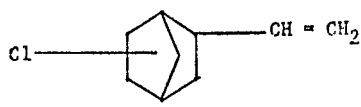

The addition of 222 grams of 2-vinylbicyclo [2.2.1]hept-5-ene to 444 grams of concentrated hydrochloric acid at 25° C. was followed by a slightly exothermic reaction which raised the temperature to 50° C. over a period of ninety minutes. After this reaction had subsided, the mixture was heated to 60° C. for an additional ninety minutes and then allowed to cool. The organic layer was diluted with a little toluene, washed with dilute sodium hydroxide solution, dried over sodium sulfate, and distilled. There was obtained 172 grams of 2-vinylbicyclo[2.2.1]hept-5(6)-yl chloride. Redistilled material had the following properties: B.P. 79°/11 mm., $n$ 30/D 1.4935.

*Analysis.*—Calculated for $C_9H_{13}Cl$: C, 69.01; H, 8.36. Found: C, 69.24; H, 8.06.

Example IV.—2-epoxyethylbicyclo[2.2.1]hept-5(6)-yl chloride

To 94 grams of 2-vinylbicyclo[2.2.1]hept-5(6)-yl chloride, prepared as in Example III, which was maintained with stirring at 55 to 60° C., there was added dropwise over a period of 2 hours and 15 minutes 222 grams of a 24.8 percent solution of peracetic acid in ethyl acetate. After an additional 3 hours at 57° C., 95 percent of the theoretical amount of peracetic acid had been consumed. After standing overnight at 0° C. the solution was freed of volatiles by co-distillation with ethylbenzene and distilled through a short column to give 89 grams of 2-epoxyethylbicyclo[2.2.1]hept-5(6)-yl chloride, B.P. 75°/1 mm., $n$ 30/D 1.4998.

The product had an indicated purity of 95.5 percent by epoxide analysis (pyridine hydrochloride method).

Example V.—2-vinylbicyclo[2.2.1]hept-5(6)-yl isothiocyanate

A mixture of 120 grams of 2-vinylbicyclo[2.2.1]hept-5-ene, 75 grams of water, and 76 grams of ammonium isothiocyanate was stirred and heated at 98° C. while 100 ml. of concentrated hydrochloric acid was added dropwise over a period of one hour. After an additional three hours at 90° C., the mixture was cooled and filtered. The organic layer was separated, 100 ml. of ethyl ether being added to facilitate layer separation, and distilled through a short column to give 89 grams of 2-vinylbicyclo [2.2.1]hept-5(6)-yl isothiocyanate, B.P. 87 to 89°/2 mm.

*Analysis.*—Calculated for $C_{10}H_{13}NS$: C, 67.02; H, 7.31. Found: C, 66.82; H, 7.37.

Example VI.—2-vinyl-5(6)-allyloxybicyclo[2.2.1] heptane

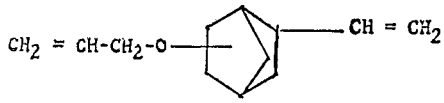

A mixture of 2-vinylbicyclo[2.2.1]hept-5-ene (240 grams), allyl alcohol (348 grams), and boron trifluoride-etherate (40 grams) was heated at reflux for 4 hours. The kettle temperature was 94° C. at the start and 97° C. at the end of the reaction. The reaction mixture was cooled, washed successively with 200 ml. of water, 200 ml. of 5 percent aqueous sodium hydroxide solution, and 200 ml. of water, dried over sodium sulfate and distilled under reduced pressure. There was obtained 255 grams of 2-vinyl-5(6)-allyloxybicyclo[2.2.1]-heptane. B.P. 83°/5 mm., $n$ 30/D 1.4773.

*Analysis.*—Calc'd for $C_{12}H_{18}O$: C, 80.85; H, 10.18. Found: C, 80.91; H, 10.31.

Example VII.—2-epoxyethylbicyclo[2.2.1]hept-5(6)-yl glycidyl ether

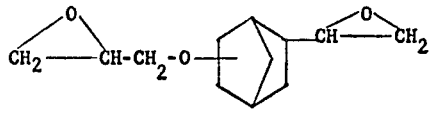

To 202 grams of 2-vinyl-5(6)-allyloxybicyclo[2.2.1]-heptane, prepared as in Example VI, which was maintained with stirring at 60 to 65° C., there was added dropwise over a period of 2½ hours 888 grams of a 24.3 percent solution of peracetic acid in ethyl acetate. After an additional three hours at about 60° C., over 97 percent of the theoretical amount of peracetic acid had been consumed. The volatiles were removed by co-distillation with ethylbenzene and the residue was fractionally distilled through an 8" x 32 mm. glass helices-packed column to give 35 grams of the monoepoxides, B.P. 68 to 97°/0.1 mm., $n$ 30/D 1.4848–1.4867, and 180 grams of 2-epoxyethylbicyclo[2.2.1]hept-5(6)-yl glycidyl ether. The hearts cut had the following properties: B.P. 111°/0.13 mm., $n$ 30/D 1.4887.

*Analysis.*—Calc'd for $C_{12}H_{18}O_3$: C, 68.54; H, 8.63. Found: C, 68.81; H, 8.67.

Example VIII.—2-vinylbicyclo[2.2.1]heptan-5(6)-ol

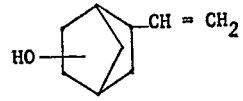

A mixture of 333 grams of 2-vinylbicyclo[2.2.1]hept-5-ene, 300 grams of concentrated sulfuric acid, and 900 grams of water was stirred and refluxed for three hours. The mixture was allowed to cool and the organic layer was separated and washed successively with water, 5 percent aqueous sodium bicarbonate solution, and water. After drying over sodium sulfate, the product, 361 grams, was distilled through a short column to give 58 grams of 2-vinylbicyclo[2.2.1]hept-5-ene, 67 grams of mids-cut, 53 grams of 2-vinylbicyclo[2.2.1]heptan-5(6)-ol, and 86 grams of higher boiling material. For comparison purposes, pure 2-vinylbicyclo[2.2.1]heptan-5(6)-ol was prepared by saponification of the corresponding formate and was found to have the following properties: B.P. 60–61°/0.35 mm., $n$ 30/D 1.4970.

*Analysis.*—Calc'd for $C_9H_{14}O$: C, 78.21; H, 10.21. Found: C, 78.49; H, 10.17.

Example IX.—1-epoxyethylbicyclo[2.2.1]heptan-5(6)-ol

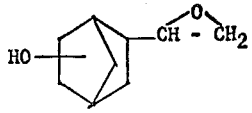

To 337 grams of 2-vinylbicyclo[2.2.1]heptan-5(6)-ol, prepared as in Example VIII, which was maintained with stirring at 50° C., there was added dropwise over a period of three hours 1106 grams of a 20.6 percent solution of peracetic acid in ethyl acetate. After an additional three hours at 50° C., 97.6 percent of the theoretical amount of peracetic acid had been consumed. After standing overnight at 0° C. the solution was freed of volatiles by co-distillation with ethylbenzene. Distillation of the residue gave 294 grams of 2-epoxyethylbicyclo[2.2.1]heptan-5(6)-ol; B.P. 92–99° C./.4 mm. A hearts cut of this material had an indicated purity of 97.2 percent by epoxide analysis (hydrogen bromide-dioxane method).

Example X.—Ethylene glycol bis(2-vinylbicyclo[2.2.1]hept-5(6)-yl ether

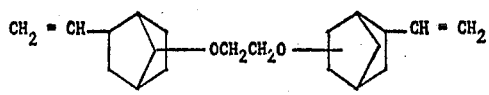

Ethylene glycol (62 grams) and boron trifluoride-etherate (9 grams) were heated at 120° C. while 2-vinylbicyclo[2.2.1]hept-5-ene (360 grams) was added dropwise over a period of two hours. After an additional four hours at 120° C., the catalyst was neutralized with 25 grams of sodium carbonate in 100 ml. of water. The reaction mixture was dissolved in 300 ml. of benzene, washed with 200 ml. of water, and flash distilled to give 144 grams of overhead product. Redistillation of the flashed product through an 8" x 1" glass helices-packed column gave 20 grams of ethylene glycol mono-2-vinylbicyclo[2.2.1]hept-5(6)-yl ether. B.P. 75–80°/0.25 mm. and 96 grams of ethylene glycol bis(2-vinylbicyclo[2.2.1]hept-5(6)-yl ether, B.P. 140°/0.25 mm.

*Analysis.*—Calc'd for $C_{20}H_{30}O_2$: C, 79.50; H, 9.99. Found: C, 80.01; H, 10.01.

Example XI.—Ethylene glycol bis(2-epoxyethylbiclclo[2.2.1]hept-5(6)-yl) ether

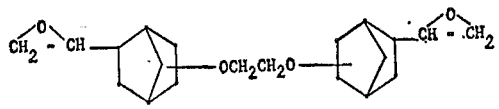

To 92 grams of ethylene glycol bis(2-vinylbicyclo[2.2.1]hept-5(6)-yl) ether, prepared as in Example X, which was maintained with stirring at 60° C., there was added dropwise over a period of 100 minutes 248 grams of a 24.2 percent solution of peracetic acid in ethyl acetate. After an additional three hours at 60° C., 96 percent of the theoretical amount of peracetic acid had been consumed. The volatiles were removed by co-distillation with ethylbenzene and the residue product, thus obtained, was distilled through a short column to give 50 grams of ethylene glycol bis(2-epoxyethylbicyclo[2.2.1]hept-5(6)-yl) ether, B.P. 191°/0.25 mm., n 30/D 1.5050.

*Analysis.*—Calc'd for $C_{20}H_{30}O_4$: C, 71.82; H, 9.04. Found: C, 72.06; H, 8.87.

Example XII.—2-vinylbicyclo[2.2.1]hept-5(6)-yl acrylate

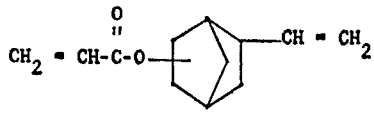

A flask containing acrylic acid (288 grams), hydroquinone (5.3 grams) and boron trifluoride etherate (5.3 grams) was maintained at 75° C. while 2-vinylbicyclo-[2.2.1]hept-5-ene (240 grams) was slowly added to the mixture. The reaction mixture was maintained at 75° C. for two hours after the addition of 2-vinylbicyclo[2.2.1]hept-5-ene had been completed. Benzene (550 cc.) was added and the resultant solution was washed with water. Additional hydroquinone (5.3 grams) was added and the product was distilled through a short Vigreux column. In order to minimize polymerization during distillation, nitric oxide was introduced into the system through a capillary ebullator. There was thus obtained 135 grams (35 percent) of 2-vinylbicyclo[2.2.1]hept-5(6)-yl acrylate; B.P. 63–66° C./0.1 mm., n 30/D 1.4844–1.4850.

*Analysis.*—Calc'd for $C_{12}H_{16}O_2$: C, 74.97; H, 8.39. Found: C, 75.06; H, 8.46.

Saponification equivalent calc'd for $C_{13}H_{18}O_2$: 192. Found: 196.

Example XIII.—2-epoxyethylbicyclo[2.2.1]hept-5(6)-yl acrylate

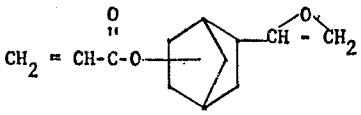

The 2-vinylbicyclo[2.2.1]hept-5(6)-yl acrylate (.69 mole), prepared in Example XII, and 2,6-dinitro-4-chlorophenol (1.3 grams) were charged to a flask fitted with stirrer, condenser, dropping funnel and thermometer. The temperature of the reaction mixture was maintained at 50° C. while a solution of peracetic acid (.76 mole) in ethyl acetate was added dropwise to the diolefin. Addition of the peracetic acid required two hours. The reaction mixture was then maintained at 50° C. for an additional five hours. At the end of this time, 91 percent of the theoretical amount of peracetic acid had been consumed. The volatiles were removed by co-distillation with ethylbenzene and the residue was vacuum distilled through a short packed column. In order to minimize polymerization during distillation, nitric oxide was introduced into the system through a capillary ebullator. There was thus obtained 60 grams (42 percent) of the epoxyacrylate; B.P. 88–93° C./0.1 mm., n 30/D 1.4896–1.4908.

The infrared spectrum of this material was consistent with the assigned structure. Analysis: purity by HBr-dioxane method 98.9 percent (assuming one equivalent of HBr is consumed by addition to the double bond of the acrylate group and a second equivalent is consumed by addition to the epoxide).

Calc'd for $C_{12}H_{16}O_3$: C, 69.21; H, 7.74. Found: C, 68.98; H, 7.83.

Example XIV.—2-vinylbicyclo[2.2.1]hept-5(6)-yl methacrylate

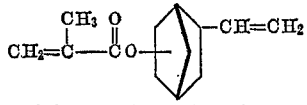

A flask containing methacrylic acid (200 grams), hydroquinone (4.8 grams) and boron trifluoride etherate (4.8 grams) was maintained at 75° C. while 2-vinylbicyclo[2.2.1]hept-5-ene (270 grams) was slowly added to the mixture. The reaction mixture was maintained at 75° C. for two hours after the addition of 2-vinylbicyclo[2.2.1]hept-5-ene had been completed. Benzene (500 cc.) was added and the resultant solution was washed with water. Additional hydroquinone (4.8 grams) was added and the product was distilled through a short Vigreux column. In order to minimize polymerization during distillation, nitric oxide was introduced into the system through a capillary ebullator.

Redistillation of the above material through a short packed column gave 89 grams (19 percent) of 2-vinylbicyclo-[2.2.1]hept-5(6)-yl methacrylate; B.P. 68–69° C./0.2 mm.; n 30/D 1.4848–1.4822.

*Analysis.*—Calc'd for $C_{13}H_{18}O_3$: C, 75.69; H, 8.80. Found: C, 75.37; H, 8.73.

Saponification equivalent calc'd for $C_{13}H_{18}O_2$: 206. Found: 210.

Example XV.—2-epoxyethylbicyclo[2.2.1]hept-5(6)-yl methacrylate

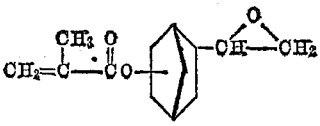

The 2-vinylbicyclo[2.2.1]hept-5(6)-yl methacrylate (1.12 moles), prepared as in Example XIV, and 2,6-dinitro-4-chlorophenol (2.3 grams) were charged to a flask fitted with stirrer, condenser, dropping funnel and thermometer. The temperature of the reaction mixture was maintained at 50° C. while a solution of peracetic acid (1.23 moles) in ethyl acetate was added dropwise to the diolefin. Addition of the peracetic acid required 2.25 hours. The reaction mixture was then maintained at 50° C. for an additional 6.5 hours. At the end of this time 92 percent of the theoretical amount of peracetic acid had been consumed. The volatiles were removed by codistillation with ethylbenzene. An additional amount (2.3 grams) of 2,6-dinitro-4-chlorophenol was added to the residue which was then vacuum distilled through a short packed column. In order to minimize polymerization during distillation, nitric oxide was introduced into the system through a capilliary ebullator. There was thus obtained 100 grams (40 percent) of the epoxymethacrylate; B.P. 94–100° C./12–0.25 mm., $n$ 30/D 1.4870–1.4893. The infrared spectrum of this material was consistent with the assigned structure. Analysis: purity by HBr-dioxane method 94.8 percent (assuming one equivalent of HBr is consumed by addition to the double bond of the methacrylate group and a second equivalent is consumed by addition to the epoxide).

Analysis.—Calc'd for $C_{13}H_{18}O_3$: C, 70.24; H, 8.16. Found: C, 69.58; H, 8.10.

Example XVI.—Bis(2-vinylbicyclo[2.2.1]hept-5(6)-yl) ether

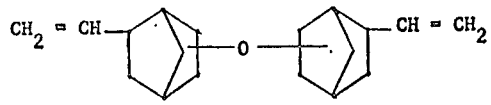

A flask containing 2-vinylbicyclo[2.2.1]heptan-5(6)-ol (276 grams), prepared as in Example VIII, and boron trifluorideetherate (28 grams) was heated to 100° C. and 2-vinylbicyclo[2.2.1]hept-5-ene (288 grams) was added slowly to the mixture. It soon became apparent that polymer formation was going to be excessive at 100° C., so the temperature was lowered to 80° C. The reaction mixture was maintained at 80° C. for 3¼ hours after the addition of 2-vinylbicyclo[2.2.1]hept-5-ene had been completed and was then allowed to stand overnight at room temperature. Benzene (500 cc.) was added and the resultant solution was washed with water and then with dilute aqueous sodium hydroxide. The product was flash distilled to separate it from polymer and was then redistilled to give 209 grams (41 percent) of bis-2-vinylbicyclo[2.2.1]hept-5-(6)-yl ether; B.P. 106–110° C./0.3 mm.; $n$ 30/D 1.5080–1.5092.

Analysis.—Calc'd for $C_{18}H_{26}O$: C, 83.66; H, 10.10. Found: C, 83.74; H, 9.95.

Iodine number calc'd for $C_{18}H_{26}O$: 196.5. Found: 212.

Example XVII.—Bis(2-epoxyethylbicyclo[2.2.1]hept-5(6)-yl) ether

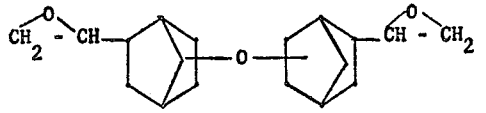

The bis(2-vinylbicyclo[2.2.1]hept-5(6)-yl) ether (.70 mole), prepared as in Example XVI, was charged to a flask fitted with stirrer, condenser, dropping funnel and thermometer. The temperature of the reaction mixture was maintained at 50° C. while a solution of peracetic acid (1.7 moles) in ethyl acetate was added dropwise to the diolefin. Addition of the peracetic acid required 1.5 hours. The reaction was then maintained at 50° C. for an additional 4.5 hours. At the end of this time 98 percent of the theoretical amount of peracetic acid had been consumed. The volatiles were removed by codistillation with ethylbenzene and the residue was distilled to give 16.5 grams (82 percent) of the diepoxide; B.P. 175° C./0.08 mm., $n$ 30/D 1.5119. Analysis: purity by HBr-dioxane method 95.0 percent.

Calc'd for $C_{18}H_{26}O_3$: C, 74.44; H, 9.03. Found: C, 74.51; H, 9.16.

Example XVIII.—2-vinylbicyclo[2.2.1]hept-5(6)-yl 2,2-dimethyl-4-pentenoate

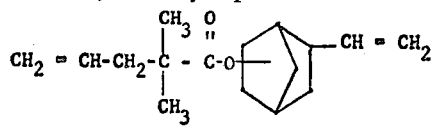

A flask containing 2,2-dimethyl-4-pentenoic acid (152 grams) and boron trifluoride-etherate (10 grams) was maintained at 85° C. while 2-vinylbicyclo[2.2.1]hept-5-ene (144 grams) was added slowly to the mixture. The reaction mixture was maintained at 80° C. for one hour after the addition of 2-vinylbicyclo[2.2.1]hept-5-ene had been completed and was then allowed to stand overnight at room temperature. The material thus obtained was washed with water and with dilute aqueous sodium hydroxide and was finally distilled. There was thus obtained 85 grams (29 percent) of 2-vinylbicyclo[2.2.1]hept-5(6)-yl-2,2-dimethyl-4-pentenoate; B.P. 106° C./1.25 mm., $n$ 30/D 1.4708–1.4722.

Analysis.—Calc'd for $C_{16}H_{24}O_2$: C, 77.37; H, 9.74. Found: C, 77.38; H, 9.78.

Iodine number calc'd for $C_{16}H_{24}O_2$: 204.5. Found: 203.

Example XIX.—2-epoxyethylbicyclo[2.2.1]hept-5(6)-yl 2,2-dimethyl-4,5-epoxypentenoate

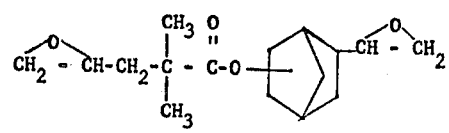

The 2-vinylbicyclo[2.2.1]hept-5(6)-yl 2,2-dimethyl-4-pentenoate (0.62 mol), prepared as in Example XVIII, was charged to a one-liter flask fitted with stirrer, condenser, dropping funnel and thermometer. The temperature of the reaction mixture was maintained at 50° C. while a solution of peracetic acid (1.4 moles) in ethyl acetate was added dropwise to the diolefin. Addition of the peracetic acid required two hours. The reaction mixture was then maintained at 50° C. for an additional nine hours. At the end of this time, 94 percent of the theoretical amount of peracetic acid had been consumed. The volatiles were removed by codistillation with ethylbenzene and the residue was distilled to give 43 grams (25 percent) of the diepoxide; B.P. 133–134° C./0.08 mm., $n$ 30/D 1.4802–1.4808. Analysis: purity by HBr-dioxane method 103 percent. The infrared spectrum of this material was consistent with the assigned structure.

Calc'd for $C_{16}H_{24}O_4$: C, 68.54; H, 8.63. Found: C, 67.94; H, 8.72.

Example XX.—2-vinylbicyclo[2.2.1]hept-5(6)-yl 2,2-dimethyl-4-pentenyl ether

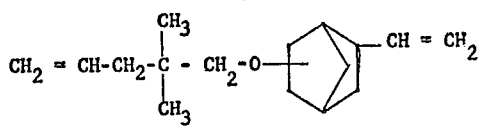

A flask containing 2,2-dimethyl-4-pentenol (400 grams), boron trifluoride-etherate (64 grams) and hydroquinone (2 grams) was maintained at 80° C. while 2-vinylbicyclo[2.2.1]hept-5-ene (649 grams) was added slowly to the mixture. This reaction mixture was maintained at 80° C. for one hour after the addition of 2-vinylbicyclo[2.2.1] hept-5-ene had been completed and was then allowed to stand overnight at room temperature. It was then heated at 100° C. for an additional two hours, washed with water and with dilute aqueous sodium hydroxide, and finally distilled. There was thus obtained 376 grams (45 percent) of 2-vinylbicyclo[2.2.1]hept-5-(6)-yl 2,2-dimethyl-4-pentenyl ether; B.P. 98–100° C./1.4–1.5 mm., $n$ 30/D 1.4700–1.4710.

Analysis.—Calc'd for $C_{16}H_{26}O$: C, 81.99; H, 11.18. Found: C, 82.03; H, 11.18.

Example XXI.—2-epoxyethylbicyclo[2.2.1]hept-5(6)-yl 2,2-dimethyl-4,5-epoxypentyl ether

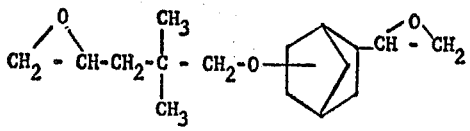

The 2-vinylbicyclo[2.2.1]hept-5(6)-yl 2,2-dimethyl-4-pentenyl ether (1.1 moles), prepared as in Example XX, was charged to a flask fitted with stirrer, condenser, dropping funnel and thermometer. The temperature of the reaction mixture was maintained at 40° C. while a solution of the peracetic acid (2.6 moles) in ethyl acetate was added dropwise to the diolefin. Addition of the peracetic acid required three hours. The reaction mixture was then maintained at 40° C. for an additional nine hours. At the end of this time 94 percent of the theoretical amount of peracetic acid had been consumed. The volatiles were removed by codistillation with ethylbenzene and the residue was distilled to give 85 grams (29 percent) of the diepoxide; B.P. 128° C./0.03 mm., $n$ 30/D 1.4790. Analysis: purity by HBr-dioxane method 86.5 percent. The infrared spectrum of this material was consistent with the assigned structure.

Calc'd for $C_{16}H_{26}O_3$: C, 72.16; H, 9.84. Found: C, 72.12; H, 9.86.

The 2-vinylbicyclo[2.2.1]hept-5(6)-yl compounds of this invention find a wide variety of uses. Among these are those of solvents for resins and oils, monomers for preparing synthetic waxes and resins, chemical intermediates for pharmaceuticals, wetting agents, insecticides, emulsifying agents, detergents, bactericides and fungicides.

The 2-vinylbicyclo[2.2.1]hept-5(6)-yl esters of this invention, e.g., 2-vinylbicyclo[2.2.1]hept-5(6)-yl acrylate, are particularly useful as vehicles in preparing paints, varnishes and similar coating materials. For this purpose, they may be admixed with at least one oxidation catalyst. These oxidation catalysts include peroxides, such as benzoyl peroxide, tert. butyl hydroperoxide, or aluroyl peroxide, and metallic driers, such as the oil-soluble salts of heavy metals, typified by lead, cobalt, manganese, and other polyvalent metals supplying siccative action, and of carboxylic acids imparting oil-solubility to the salt, including naphthenic acids, long-chain fatty acids such as linoleic and linolenic, and ether acids, such as butoxyacetic or octyloxyacetic acids. Mixtures of peroxides and metallic driers are particularly efficacious.

When coating compositions comprising the polyesters of this invention and an oxidation catalyst are applied to surfaces which are then exposed to air and/or heat, they are converted to hard, tough films, which are substantially insoluble in all common organic solvents and are highly water-resistant and nonporous. When used in finishes on metal, exceptional adhesion is obtained, and treated metal sheets finished with a baked coating may be flexed without cracking or breaking of the film.

Since the new esters of this invention are compatible with nitro-cellulose as well as with the natural drying oils, for example, linseed, tung, soybean, oiticica, and fish oils, as well as with many natural and synthetic resins, they may be used for the preparation of a wide variety of coating and plastic compositions.

Some of the 2-vinylbicyclo[2.2.1]hept-5(6)-yl ethers of this invention, e.g., ethylene glycol bis(2-vinylbicyclo-[2.2.1]hept-5(6)-yl ether, possess properties fitting them for a great variety of industrial applications. Many of these new ethers are also useful as solvents for resins and waxes. High boiling ethers are useful as plasticizers for natural and synthetic resins and elastomers, including synthetic rubbers, polyvinyl chloride, polyvinyl esters, polystyrene, polyacrylic esters, polymethacrylic esters, copolymers of such materials, rubber hydrochloride, chlorinated rubber, nitrocellulose, cellulose acetate, ethyl cellulose, cellulose acetate-butyrate, etc. Derivatives containing such groups as halogen, nitro, cyano, thiocyano, etc., possess insecticidal action to a marked degree. Some of the lower ethers have pleasant, flowery odors which recommend them for such uses as scenting soaps, cosmetics, and the like.

The ethers of this invention possessing a double bond may be reacted with hydrogen, halogen, thiocyanogen and similar agents to yield new compounds which are themselves useful as solvents, hydraulic fluids, oil additives, insecticides, etc. The ethers also react with sulfuric acid to give water-soluble products useful as wetting and penetrating agents, emulsifiers, and detergents.

The 2-vinylbicyclo[2.2.1]hept-5(6)-yl thioethers of this invention may be useful, per se, as insecticides, fungicides, antioxidants, rubber vulcanization accelerators, and as additives for improving petroleum products.

Certain 2-epoxyethylbicyclo[2.2.1]hept-5(6)-yl compounds of this invention are especially useful in the resin art. They are capable of being cured at room temperature with aliphatic amines to give polymers useful in resin applications. The vicinal epoxides afford relatively high molecular weight resins when cured with polycarboxylic acids.

The following example illustrates the usefulness of a 2-epoxyethylbicyclo[2.2.1]hept-5(6)-yl compound of this invention.

Example XXII.—2-epoxyethylbicyclo[2.2.1]hept-5(6)-yl glycidyl ether resins

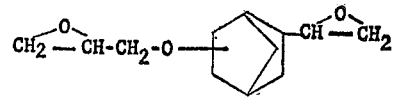

2-epoxyethylbicyclo[2.2.1]hept-5(6)-yl glycidyl ether, prepared as in Example VII, forms resins readily with both acidic and basic hardeners. It cures exothermally from room temperature with aliphatic polyamines to give resins with heat distortion points as high as 97° C. A heat distortion point of 233° C. was obtained from 2-epoxyethylbicyclo[2.2.1]hept-5(6)-yl glycidyl ether and p,p'-methylenedianiline combination after curing at 200° C.

2-epoxyethylbicyclo[2.2.1]hept-5(6)-yl glycidyl ether formed resins readily with both acidic and basic hardeners. With the reaction product of 1 mol of diethylenetriamine with 1 mol of ethylene oxide, an amine hardener, 2-epoxyalkylbicyclo[2.2.1]hept-5(6)-yl glycidyl ether reacted exothermally from room temperature; a 25 gram test bar, after standing at room temperature for eight days, had a heat distortion point of 97° C. After a post-cure of two hours at 120° C., this value was increased to 106° C. and a flexural strength of 17,940 pounds per square inch was observed.

When hardened with para, para'-methylenedianiline, 2-epoxyethylbicyclo[2.2.1]hept-5(6)-yl-glycidyl ether gave a resin with heat distortion points of 190° C. and 233° C. after curing at 160° C. (six hours) and 200° C. (four hours), respectively.

The addition of 2-epoxyethylbicyclo[2.2.1]hept-5(6)-yl-glycidyl ether to the diglycidyl ether of 2,2-bis(p-hydroxyphenyl)propane to the extent of 20 percent of the mixture resulted in a viscosity decrease of from 11,000 to 2,000 centipoises at 25° C. This mixture, when hardened with the reaction product of 1 mol of diethylenetriamine with 1 mol of ethylene oxide, gave a resin with heat distortion point of 78° C. after curing for eight days at room temperature. A post-cure of two hours at 120° C. raised this value to 90° C. The cured resin, when tested for flexural strength, yielded at 18,660 p.s.i. without breaking. The resulting test was (5 x ½ x ¼ inches), after essentially recovering from the flexural test, had an Izod impact of 0.8 ft. lb./in. notch.

2-epoxyethylbicyclo[2.2.1]hept-5(6)-yl-glycidyl ether has been shown to be an amine-reactive diepoxide. The high reactivity and low viscosity should be useful in applications requiring fast-curing, solventless formulations such as those contemplated for the Gusmer gun.

Although this invention has been illustrated by the preceding examples, it is not to be construed as limited to the materials employed therein, but rather, the invention encompasses the general area as hereinbefore disclosed. Various modifications and embodiments of this invention can be made without departing from the spirit and scope thereof.

What is claimed is:

1. 2-epoxyethylbicyclo[2.2.1]hept-5(6)-yl compounds of the formula

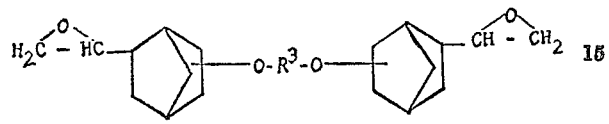

wherein $R^3$ is alkylene of from 1 to 20 carbon atoms.

2. 2-epoxyethylbicyclo[2.2.1]hept-5(6)-yl compounds of the formula

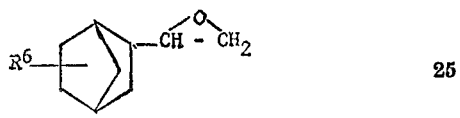

wherein $R^6$ is a member selected from the group consisting of —OH, HCOO—, $R^7SO_2$—, $R^7O$—, and $R^9COO$—; $R^7$ is a member selected from the group consisting of alkyl of from 1 to 18 carbon atoms, epoxyalkyl of from 3 to 20 carbon atoms wherein the epoxide moiety is at least one carbon atom removed from the —$SO_2$— or ether —O— atoms, cycloalkyl of from 5 to 12 carbon atoms, epoxycycloalkyl of from 5 to 12 carbon atoms wherein the epoxide moiety is at least one carbon atom removed from the —$SO_2$— or ether —O— atoms, and aryl of from 6 to 10 carbon atoms; $R^9$ is a member selected from the group consisting of alkyl of from 1 to 18 carbon atoms,

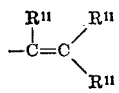

epoxyalkyl of from 3 to 20 carbon atoms wherein the epoxide moiety is at least one carbon atom removed from the —COO— moiety, cycloalkyl of from 5 to 12 carbon atoms, epoxycycloalkyl of from 5 to 12 carbon atoms wherein the epoxide moiety is at least one carbon atom removed from the —COO— moiety, and aryl of from 6 to 10 carbon atoms; and each $R^{11}$ is a member selected from the group consisting of hydrogen and alkyl of from 1 to 5 carbon atoms.

3. 2-epoxyethylbicyclo[2.2.1]hept-5(6)-yl compounds of the formula

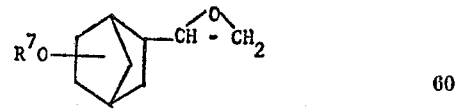

wherein $R^7$ is epoxyalkyl of from 3 to 20 carbon atoms wherein the epoxide moiety is at least one carbon atom removed from the —O— moiety.

4. 2-epoxyethylbicyclo[2.2.1]hept-5(6)-yl compounds of the formula

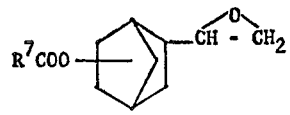

wherein $R^7$ is epoxyalkyl of from 3 to 20 carbon atoms wherein the epoxide moiety is at least one carbon atom removed from the —COO—moiety.

5.

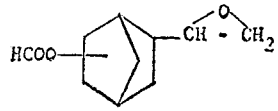

6.

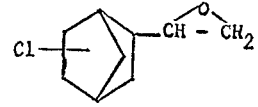

7.

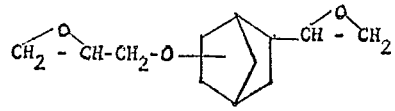

8.

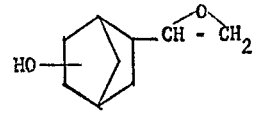

9.

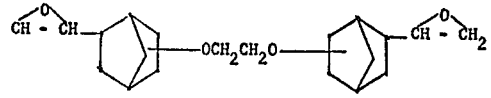

10.

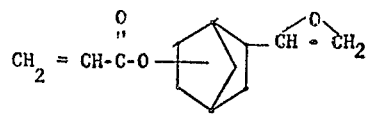

11.

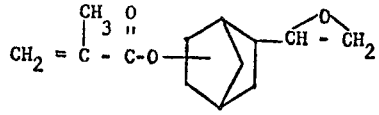

12.

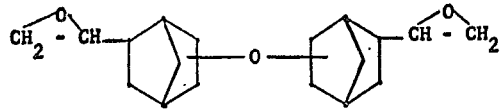

13.

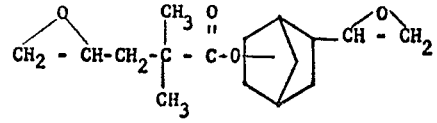

14.

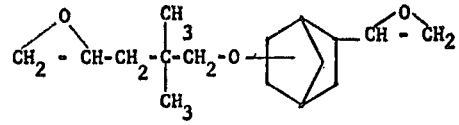

15. 2 - epoxyethyl bicyclo[2.2.1]hept - 5(6) - yl compounds of the formula

wherein $R^2$ is a member selected from the group consisting of —$SO_2$—, —O—, —$OR^3O$—,

—OOC—$R^4$—COO—

$-O-\overset{O}{\underset{\|}{C}}-O-$ and $(O-CH_2-\overset{Y}{\underset{|}{C}H})-O-$ $R^3$ is selected from the group consisting of alkylene of from 1 to 18 carbon atoms, alkenylene of from 4 to 20 carbon atoms, cycloalkylene of from 5 to 12 carbon atoms, cycloalkenylene of from 5 to 12 carbon atoms, and arylene of from 6 to 10 carbon atoms; $R^4$ is a member selected from the group consisting of alkylene of from 1 to 18 carbon atoms, alkenylene of from 2 to 20 carbon atoms, cycloalkylene of from 5 to 12 carbon atoms, cycloalkenylene of from 5 to 12 carbon atoms, and arylene of from 6 to 10 carbon atoms; Y is a member selected from the group consisting of hydrogen, methyl and ethyl; and $x$ is an integer of from 1 to 5 inclusive.

References Cited

UNITED STATES PATENTS 3,280,152  10/1966  Tinsley et al. _____ 260—348

NORMA S. MILESTONE, Primary Examiner

U.S. Cl. X.R.

117—132, 138; 252—52, 89, 351, 522; 260—2, 29, 30, 33, 240, 405, 413, 454, 465, 468, 469, 473, 474, 475, 476, 481, 484, 485, 486, 487, 488, 607, 609, 611, 612, 613, 617, 648, 666, 999